Jan. 5, 1932. P. E. FENTON ET AL 1,840,272
FLOATING TYPE CARPET STUD
Filed May 22, 1931
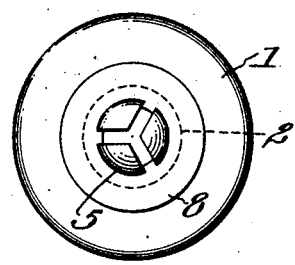
Fig. 1.
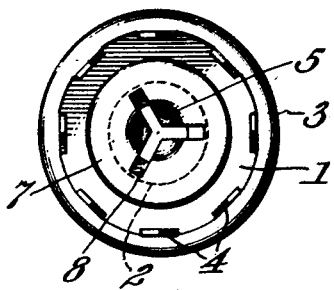
Fig. 2.
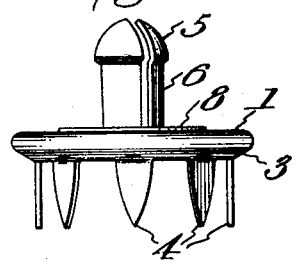
Fig. 3.
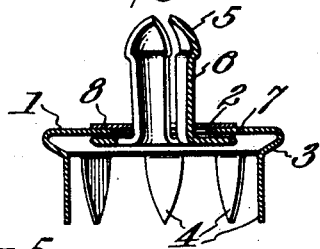
Fig. 4.
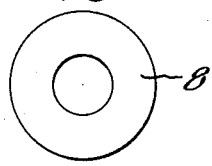
Fig. 5.
Fig. 6.
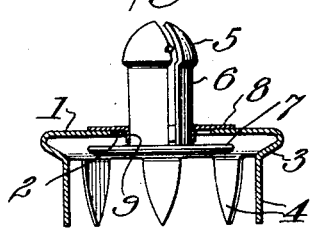
Fig. 7.
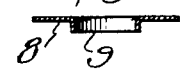
Fig. 8.
Fig. 9.
Inventors
Paul E. Fenton
Edmund A. Janes
by M. H. Finckel
Attorney Patented Jan. 5, 1932

1,840,272

UNITED STATES PATENT OFFICE

PAUL E. FENTON, OF THOMASTON, AND EDMUND D. JANES, OF WATERBURY, CONNECTICUT, ASSIGNORS TO SCOVILL MANUFACTURING COMPANY, OF WATERBURY, CONNECTICUT, A CORPORATION OF CONNECTICUT

FLOATING TYPE CARPET STUD

Application filed May 22, 1931. Serial No. 539,358.

The object of this invention is to provide a very simple and efficient means for connecting or assembling the prong-attached base or casing and the resilient floating stud of a carpet fastener, without upsetting any part of either element.

The invention consists in a carpet fastener of the type mentioned, in which the base or casing and the stud are connected or assembled by means of a washer applied to the resilient stud and abutting against the base or casing, the resilience of the stud serving to hold the washer in place and thus providing for handling the fastener in use and for packing purposes without liability of accidental separation or displacement of parts and also without the necessity of displacing a part or parts of the base or casing, such as its prongs, for effecting the union of the base or casing and the stud, as we will proceed now more particularly to explain and finally claim.

In the accompanying drawings illustrating the invention, in the several figures of which like parts are similarly designated, Figure 1 is a top plan view; Fig. 2 is a bottom plan view; Fig. 3 is an elevation, and Fig. 4 is a longitudinal section of one embodiment of the principle of our invention. Fig. 5 is a plan view, and Fig. 6 is a cross section of a plain, flat washer employed in making the connection or assembly of the base or casing and the resilient stud. Fig. 7 is a longitudinal section of our invention in which the stud is shown in elevation, and embodying another form of washer. Fig. 8 is a plan view, and Fig. 9 is a cross section of the other form of washer shown in Fig. 7, same being provided with an interior flange or hub.

The base or casing comprises a portion 1 having a central opening 2 of larger diameter than the aftermentioned shank of the stud and of smaller diameter than the flange of said stud. From the periphery of the portion 1 extends an inturned rim 3 spaced apart at an incline from the portion 1, and having the prongs 4 extending from the inner edge of the rim 3, by which the fastener may be attached to a carpet, rug or other floor covering.

The stud is of the resilient type, having the dome-like head 5, the shank 6, and the flange 7. The head and shank are slitted longitudinally and into but not throughout the flange, so as to render the stud resilient and permit its use with a non-resilient or other socket.

The stud is placed in the base or casing by passing its head through the hole 2, and the stud and base or casing are connected or assembled by means of a washer 8 snapped or sprung over the head and upon the shank and stopped by the portion 1 of the base or casing.

The resilience of the head and shank of the stud is sufficient to hold the washer in place and to complete the connection or assembling of the stud and base or casing. This security is enhanced by making the shank tapering outwardly from its flange to its head.

In some cases the washer instead of being a perfectly flat annulus, as shown in Figs. 1, 3, 4, 5 and 6, may have an interior flange 9, Figs 7, 8 and 9, made as a drawn hub. The flange 9 increases the area of hold of the washer on the resilient shank.

By the construction explained, it is not necessary, as in prior fasteners of this type, to use for the connection or assembling of the base or casing and the stud any of the prongs or their equivalents on the base or casing to support the stud, by bending them against the flange of the stud.

Furthermore, by discarding the inturned prongs or their equivalents as a means for connecting the base or casing and the stud, the floating of the stud to accommodate its location with and engagement of the socket is maintained, freely, without danger of being cramped by undue pressure upon the fastener serving to bind against the flange of the stud.

The avoidance of cramping or binding is further provided for by the inturned rim affording a large contact surface with the carpet, and the minimizing or removing any tendency of the rim to cut into the carpet.

Variations in the details of construction and arrangement of parts are permissible within the principle of the invention and the claims following.

What we claim is:—

1. A floating type carpet stud, comprising a base or casing having a portion provided with an opening larger than the shank of the aftermentioned stud and also provided with attaching means, and a stud having a head and shank passed through said opening so as to extend beyond one side of said portion and a flange located upon the opposite side of said portion, and a washer snapped over the head and shank and stopped by said portion and serving with the flange as the sole means to connect and assemble the base or casing and stud, thereby providing for handling the assembled parts for packing purposes, as well as for setting, without liability of accidental separation or displacement and without the necessity for extraneous or added connecting means.

2. A floating type carpet stud, comprising a base or casing having a portion provided with an opening larger than the shank of the aftermentioned stud and also provided with attaching means, and a stud having a head and shank passed through said opening and projecting outwardly from one side of said portion and a flange located upon the opposite side of said portion, said head and shank being resilient, and a washer snapped over the head and shank and stopped by said portion and serving with said flange as the sole means to connect and assemble the base or casing and stud, thereby providing for handling the assembled parts for packing purposes, as well as for setting, without liability of accidental separation or displacement and without the necessity for extraneous or added connecting means.

3. A floating type carpet stud, comprising a base or casing having a portion provided with an opening larger than the shank of the aftermentioned stud and also provided with attaching means, and a stud having a head and shank passed through said opening and extending outwardly from one side of said portion and a flange located upon the opposite side of said portion, said head and shank being resilient, and a rigid washer snapped over the head and shank and stopped by said portion and serving together with said flange as the sole means to connect and assemble the base or casing and stud, thereby providing for handling the assembled parts for packing purposes, as well as for setting, without liability of accidental separation or displacement and without the necessity for extraneous or added connecting means.

4. A floating type carpet stud, comprising a base or casing having a portion provided with an opening larger than the shank of the aftermentioned stud and also provided with attaching means, and a stud having a head and shank passed through said opening and extending operatively beyond said portion on one side thereof and a flange located upon the opposite side of said portion, and a washer snapped over the head and shank and stopped by said portion and serving cooperatively with said flange as the sole means to connect and assemble the base or casing and stud, the washer having an interior flange or hub which engages the shank, thereby providing for handling the assembled parts for packing purposes, as well as for setting, without liability of accidental separation or displacement and without the necessity for extraneous or added connecting means.

5. A floating type carpet stud, comprising a base or casing having a portion provided with an opening larger than the shank of the aftermentioned stud and also provided with an inturned rim having attaching prongs extending from its inner edge, and a stud having a head and shank passed through said opening and beyond one side thereof and a flange located upon the opposite side of said portion, and a washer snapped over the head and shank and stopped by said portion and serving with the said flange as the sole means to connect and assemble the base or casing and stud, thereby providing for handling the assembled parts for packing purposes, as well as for setting, without liability of accidental separation or displacement and without the necessity for extraneous or added connecting means.

In testimony whereof we have hereunto set our hands this 21 day of May A. D. 1931.

PAUL E. FENTON.
EDMUND D. JANES.